United States Patent
Nakatani et al.

(10) Patent No.: US 10,160,144 B2
(45) Date of Patent: Dec. 25, 2018

(54) METHOD FOR MANUFACTURING FOAMABLE INJECTION MOLDING AND INJECTION DEVICE THEREFOR

(71) Applicants: TOYO SEIKAN GROUP HOLDINGS, LTD., Tokyo (JP); TOSHIBA MACHINE ENGINEERING CO., LTD., Numazu-shi, Shizuoka (JP)

(72) Inventors: Toyohiko Nakatani, Yokohama (JP); Kentarou Ichikawa, Yokohama (JP); Hideo Tanaka, Numazu (JP); Kazuhito Sato, Numazu (JP); Kishbaugh Levi, Groveland, MA (US)

(73) Assignees: TOYO SEIKAN GROUP HOLDINGS, LTD., Tokyo (JP); TOSHIBA MACHINE ENGINEERING CO., LTD., Shizuoka (JP)

( * ) Notice: Subject to any disclaimer, the term of this patent is extended or adjusted under 35 U.S.C. 154(b) by 469 days.

(21) Appl. No.: 14/768,819

(22) PCT Filed: Feb. 20, 2014

(86) PCT No.: PCT/JP2014/000876
§ 371 (c)(1),
(2) Date: Aug. 19, 2015

(87) PCT Pub. No.: WO2014/132598
PCT Pub. Date: Sep. 4, 2014

(65) Prior Publication Data
US 2016/0001474 A1    Jan. 7, 2016

(30) Foreign Application Priority Data
Feb. 26, 2013   (JP) ................................ 2013-036044

(51) Int. Cl.
B29C 44/34   (2006.01)
B29C 45/50   (2006.01)
(Continued)

(52) U.S. Cl.
CPC ........ B29C 44/3446 (2013.01); B29C 44/421 (2013.01); B29C 45/0055 (2013.01);
(Continued)

(58) Field of Classification Search
CPC ................ B29C 45/5092; B29C 45/50; B29C 2045/5004; B29C 2045/548; B29C 47/0876
See application file for complete search history.

(56) References Cited

U.S. PATENT DOCUMENTS 4,211,523 A   7/1980 Humerberg
5,997,781 A   12/1999 Nishikawa et al.
(Continued)

FOREIGN PATENT DOCUMENTS

CN   2668374 Y   1/2005
CN   1878651 A   12/2006
(Continued)

OTHER PUBLICATIONS

Communication dated Sep. 22, 2016, from the European Patent Office in counterpart European application No. 14 756 937.0.
(Continued)

*Primary Examiner* — Benjamin A Schiffman
(74) *Attorney, Agent, or Firm* — Sughrue Mion, PLLC

(57) ABSTRACT

A plasticizing process in which a molten resin that has been plasticized and dissolved in a foaming gas is sent to the front end side of a heating cylinder (20) by means of a screw (21) that rotates in a heating cylinder (20), and the screw (21) retreats according as the molten resin accumulates in the front end side of the heating cylinder (20); a transfer process
(Continued)

in which the screw (21) is advanced with rotating and transfers the molten resin accumulated in the front end side of the heating cylinder (20) from a plasticizing unit (2) to an injection unit (3), and an injection process in which the molten resin is injected from the injection unit (3) are conducted and repeated to produce a foamable injection molded product.

9 Claims, 5 Drawing Sheets

(51) Int. Cl.
| | |
|---|---|
| B29C 45/02 | (2006.01) |
| B29C 45/54 | (2006.01) |
| B29C 45/17 | (2006.01) |
| B29C 44/42 | (2006.01) |
| B29C 45/00 | (2006.01) |
| B29C 45/53 | (2006.01) |
| B29K 67/00 | (2006.01) |
| B29K 105/04 | (2006.01) |
| B29L 31/00 | (2006.01) |

(52) U.S. Cl.
CPC .......... *B29C 45/02* (2013.01); *B29C 45/1701* (2013.01); *B29C 45/1703* (2013.01); *B29C 45/50* (2013.01); *B29C 45/5092* (2013.01); *B29C 45/54* (2013.01); *B29C 45/53* (2013.01); *B29C 2045/1702* (2013.01); *B29K 2067/003* (2013.01); *B29K 2105/04* (2013.01); *B29K 2995/0018* (2013.01); *B29L 2031/7158* (2013.01)

(56) References Cited

U.S. PATENT DOCUMENTS

| | | |
|---|---|---|
| 6,884,823 B1 | 4/2005 | Pierick et al. |
| 2004/0080065 A1 | 4/2004 | Kim |
| 2005/0163881 A1 | 7/2005 | Pierick et al. |
| 2006/0035988 A1 | 2/2006 | Pierick et al. |
| 2006/0197254 A1 | 9/2006 | Onishi |
| 2008/0050576 A1 | 2/2008 | Pierick et al. |
| 2008/0067719 A1 | 3/2008 | Schlummer et al. |

FOREIGN PATENT DOCUMENTS

| | | |
|---|---|---|
| CN | 101554762 A | 10/2009 |
| DE | 100 55 022 A1 | 5/2002 |
| DE | 10 2005 033 731 A1 | 12/2006 |
| EP | 0 242 191 A2 | 10/1987 |
| EP | 1 475 208 A2 | 11/2004 |
| JP | 48-18365 A | 3/1973 |
| JP | 50-144066 U | 11/1975 |
| JP | 60-220724 A | 11/1985 |
| JP | 10-230528 A | 9/1998 |
| JP | 2001-269963 A | 10/2001 |
| JP | 2008-94495 A | 4/2008 |
| JP | 4460074 B2 | 5/2010 |

OTHER PUBLICATIONS

International Search Report dated May 20, 2014 from the International Searching Authority in counterpart International Application No. PCT/JP2014/000876.

International Preliminary Report on Patentability and Written Opinion dated Sep. 1, 2015 from the International Searching Authority in counterpart International Application No. PCT/JP2014/000876.

Runli et al., "New Technology in Plastic Molding", National Defense Industry Press. Oct. 2006, 1st edition, pp. 47-51 (total 10 pages).

Communication dated Aug. 22, 2018 from the State Intellectual Property Office of the P.R.C. in counterpart Application No. 201480010146.2.

METHOD FOR MANUFACTURING FOAMABLE INJECTION MOLDING AND INJECTION DEVICE THEREFOR

CROSS REFERENCE TO RELATED APPLICATIONS

This is a National Stage of International Application No. PCT/JP2014/000876 filed Feb. 20, 2014, claiming priority based on Japanese Patent Application No. 2013-036044 filed Feb. 26, 2013, the contents of all of which are incorporated herein by reference in their entirety.

TECHNICAL FIELD

The present invention relates to a method for producing foamable injection molded product such as a preform that is obtained by dissolving a foaming gas such as an inert gas a thermoplastic resin in a thermoplastic resin, followed by injection molding, as well as to an injection apparatus for producing such foamable injection molded product.

BACKGROUND ART

Conventionally, a synthetic resin bottle obtained by a process in which a preform with a bottomed cylindrical shape (an injection molding) is formed by injection molding by using a thermoplastic resin such as polyethylene terephthalate, and this preform is molded by biaxial stretch blow molding or the like has been generally used in a wide range of fields as a container that accommodates contents such as various beverages.

In such a synthetic resin bottle, in order to allow contents that are easily changed in quality by light to be accommodated, known is a technology of imparting light-shielding properties by compounding a colorant such as a pigment with the thermoplastic resin.

However, in recent years, used bottles are collected and recycled as a recycled resin in various applications. Under such circumstances, there is a problem that application of recycled resins is restricted in the case where a colorant is mixed into the resins. Therefore, as a technology of imparting light-shielding properties by distributing foams on the bottle wall without compounding a colorant, proposed is a technology in which a foaming gas such as an inert gas is dissolved in a thermoplastic resin to allow fine cells to be generated when a preform is produced by injection molding, and then, this preform is foamed by a heating and blowing process in biaxial stretch blow molding, whereby the preform is molded into a prescribed bottle shape.

On the other hand, one of the applicants of the present application previously proposed a technology of further improving light-shielding properties and suppressing deterioration in appearance that is caused by presence of foams (see Patent Document 1).

In such a technology, a foaming gas such as an inert gas is dissolved in a resin and generation of foams is suppressed at the time of injection molding of a preform to obtain a preform in a non-foamed state, and this preform is foamed by a heating and blowing process in biaxial stretch blow molding, whereby the preform is molded into a bottle shape that has a large amount of small cells being distributed therein.

On the other hand, as a method for injection molding the above-mentioned foamable injection molded product, a technology utilizing a 2-stage pre-plasticizing injection apparatus that comprises a plasticizing unit and an injection unit has been proposed (see Patent Document 2). In this technology, a molten resin in which a foaming gas such as an inert gas is dissolved in the plasticizing unit is injected into an injection mold by means of a reciprocally-moving plunger that is provided in an injection unit. This apparatus is provided with an accumulator in which the molten resin is accumulated through a conduit prior to the injection.

RELATED ART DOCUMENTS

Patent Documents

Patent Document 1: JP-A-2008-94495
Patent Document 2: Japan Patent No. 4460074

SUMMARY OF THE INVENTION

Problems to be Solved by the Invention

When a synthetic resin-made foamed bottle disclosed in Patent Document 1 or the like is mass-produced, in production of an injection molded product such as a preform that is obtained by using a large amount of a resin with a short molding cycle, use of a 2-stage pre-plasticizing injection apparatus disclosed in Patent Document 2 mentioned above is possible.

However, in injection molding of a foamable injection molded product such as a preform in which a foaming gas such as an inert gas is dissolved is subjected to injection molding, it is required to allow a foaming gas to be dissolved homogenously in a molten resin during a plasticizing process (i.e. a resin-melting process). Therefore, the resin pressure of a molten resin is required to be set higher than that in normal injection molding, and the plasticizing time is required to be prolonged. Accordingly, it is desired that the screw rotation of an extrusion unit and gas injection time during the molding cycle be increased in order to improve plasticization capacity and gas dissolved, thereby to improve productivity.

Under such circumstances, in 2-stage pre-plasticizing injection molding of a foamable injection molded product in which a foaming gas such as an inert gas is dissolved in an injection molded product such as a preform, the inventors have made intensive studies in respect of increasing the plasticizing time of a raw material resin and a gas injection time during the molding cycle, thereby to improve plasticization capacity and gas dissolving. As a result, the inventors have completed the present invention.

That is, an object of the present invention is to provide a method for producing a foamable injection molding that is capable of, in injection molding of a foamable injection molded product such as a preform, increasing the time of plasticizing a raw material resin and prolonging the time of injecting a foaming gas to a plasticized molten resin, thereby improving plasticizing of a raw material resin and impregnation of a foaming gas in a molten resin, as well as to an injection apparatus for producing such a foamable injection molded product.

Means for Solving the Problems

The method for producing a foamable injection molded product according to the present invention is a method using an injection apparatus comprising a plasticizing unit that plasticizes a raw material resin and an injection unit that injects a plasticized molten resin, and the plasticizing unit is provided with a heating cylinder having a foaming gas injection valve and a screw provided inside the heating cylinder, the method comprises:

a plasticizing process wherein the raw material resin is plasticized by means of the screw provided inside the heating cylinder of the plasticizing unit, the foaming gas injected from the foaming gas injection valve is dissolved in the plasticized molten resin, and the screw retreats according as the molten resin accumulates in the front end side of the heating cylinder by the screw that is rotating, and a transfer process wherein the screw that has been retracted to a predetermined position is caused to advance while rotating, and the molten resin which has been accumulated in the front end side of the heating cylinder is transferred to the injection unit, wherein, when the transfer process is completed, the plasticizing process re-starts without stopping the rotation of the screw and an injection process in which the molten resin is injected from the injection unit is conducted, and when the injection process is completed, the plasticizing process is completed and the transfer process re-starts.

Further, the injection apparatus according to the present invention comprises a plasticizing unit that plasticizes a raw material resin and an injection unit that injects a plasticized molten resin, wherein the plasticizing unit is provided with a heating cylinder having a foaming gas injection valve and a screw provided inside the heating cylinder, and the rotation and the advance and retreat movements of the screw are controlled such that a raw material resin is plasticized by means of the screw inside the heating cylinder of the plasticizing unit and a foaming gas injected from a foaming gas injection valve is dissolved in the plasticized molten resin, and the screw retreats according as the molten resin accumulates in the front end side of the heating cylinder by the screw that is rotating, the screw advances with rotating to cause the molten resin which has been accumulated in the front end side of the heating cylinder to be transferred to the injection unit.

Advantageous Effects of the Invention

According to the present invention, in producing a foamable injection molded product by injecting molding a thermoplastic resin in which a foaming gas is dissolved, the time of plasticizing a raw material resin and the time of injecting a foaming gas to a plasticized molten resin in the molding cycle are increased, plasticizing performance and impregnation of a foaming gas are improved, leading to an increase in productivity.

MODE FOR CARRYING OUT THE INVENTION

Hereinbelow, an explanation will be made on a preferred embodiment of the invention with reference to the drawings.
[Injection Apparatus]

Figure 1:
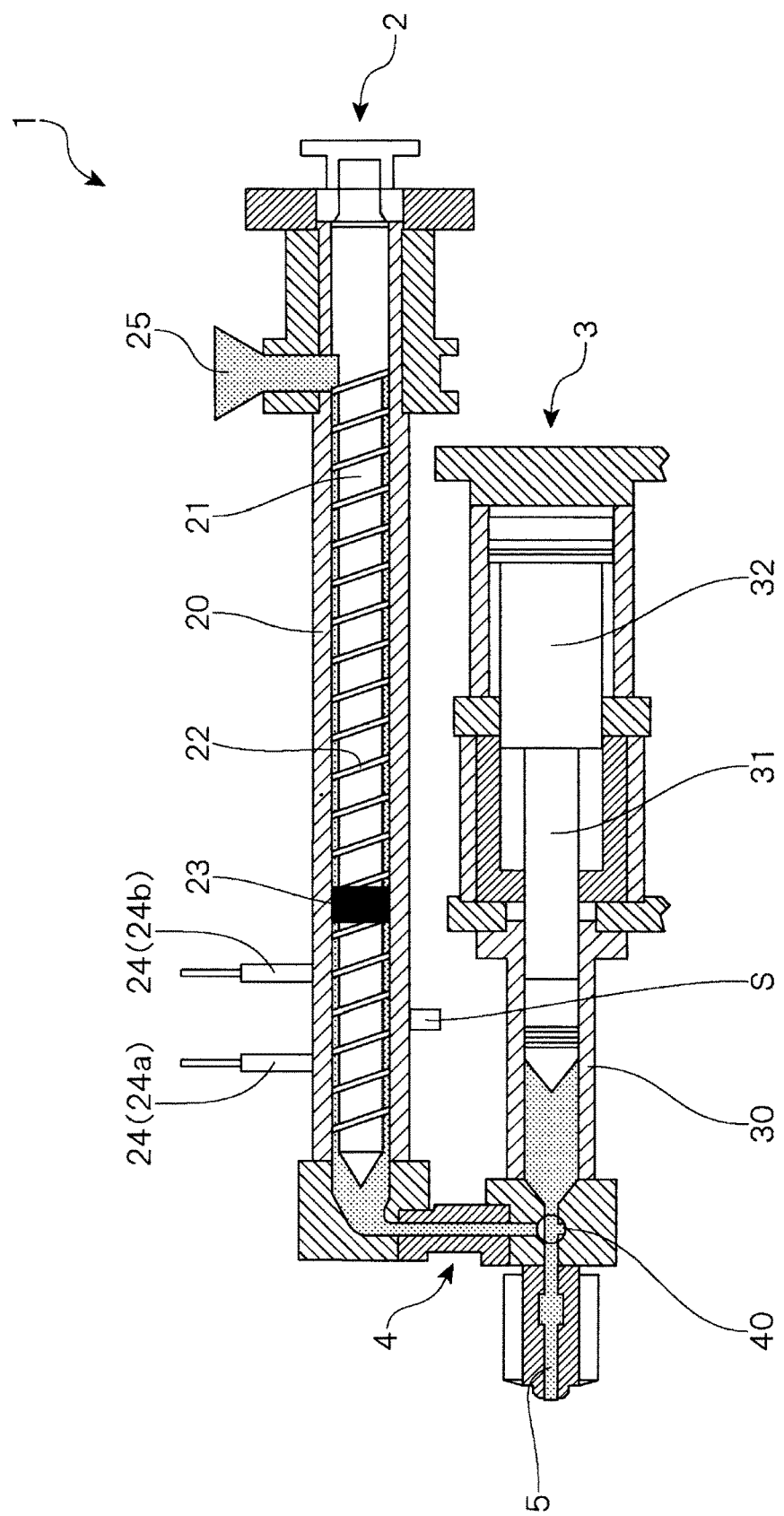
FIG. 1 is an explanatory view showing an outline of an injection apparatus according to an embodiment of the invention.

An injection apparatus 1 shown in FIG. 1 has a plasticizing unit 2 for plasticizing a raw material resin that has been fed and an injection unit 3 for injecting a plasticized molten resin.

In the injection apparatus 1 shown in FIG. 1, a heating cylinder 20 that is provided in the plasticizing unit 2 and a heat-retaining cylinder 30 that is provided in the injection unit 3 are arranged in parallel to each other, and the front end sides of these cylinders are connected through a connection part 4 having a rotary valve 40 in its inside. To the front end side of the heat-retaining cylinder 30 provided in the injection unit 3, a nozzle 5 to be attached to a mold (not shown) is connected through the connection part 4.

Figure 2:
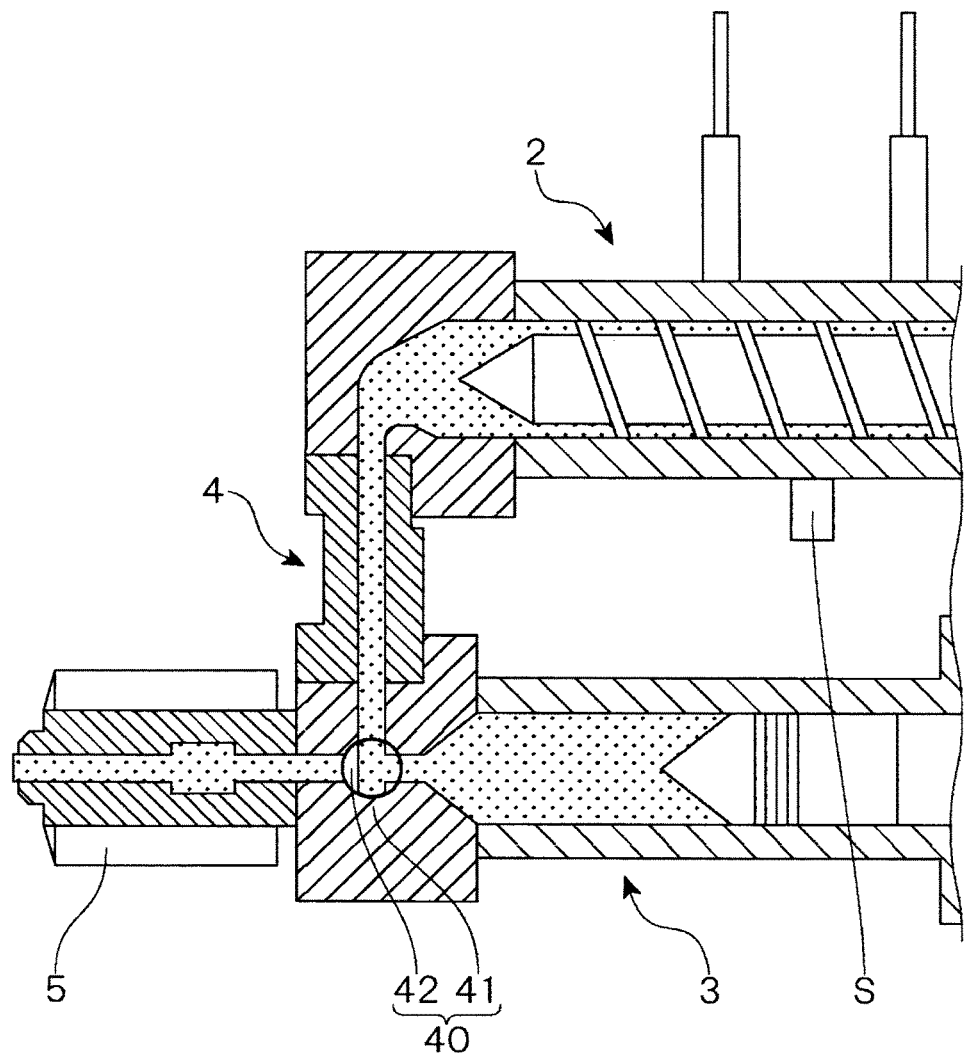
FIG. 2 is an explanatory view showing one example of a rotary valve in an injection e apparatus according to an embodiment of the invention.
Figure 3:
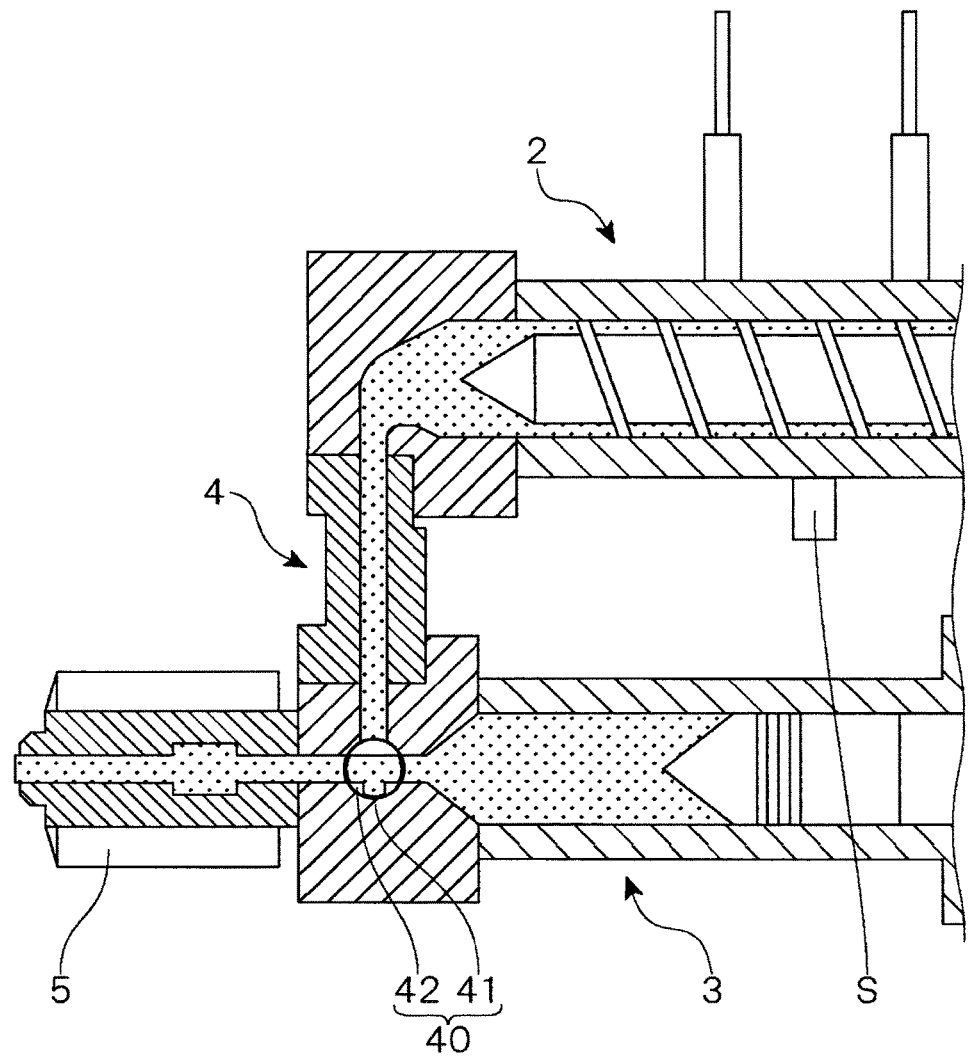
FIG. 3 is an explanatory view showing one example of a rotary valve in an injection apparatus according to an embodiment of the invention.

As shown in FIG. 2 and FIG. 3, the rotary valve 40 is provided with a cross head 41 that has a passage with a T-shaped cross section and a hollow part that has a circular cross section and is formed around the intersection of the passage, and a valve 42 that is rotatably attached to the inside of the hollow part formed in the cross head 41 and has a passage having a T-shaped cross section.

Further, as shown in FIG. 2, by switching the rotatory valve 40 to close the nozzle part 5 and to connect the plasticizing unit 2 and the injection unit 3, a molten resin that has been plasticized in the plasticizing unit 2 can be transferred to the injection unit 3. On the other hand, as shown in FIG. 3, by switching the rotary valve 40 to close the plasticizing unit 2 and to connect the injection unit 3 and the nozzle part 5, a molten resin that has been transferred to the injection unit 3 can be injected from the nozzle part 5.

Within the heating cylinder 20 that is provided in the plasticizing unit 2, a screw 21 having a helical wing part 22 is arranged. By a screw driving part, a screw advancing mechanism and a back pressure control part (all are not shown), the rotation, the advance and retreat movements of the screw 21 in the heating cylinder 20 and the resin pressure at the time of plasticizing can be controlled.

On the rear end side of the heating cylinder 20, a hopper 25 for feeding a pelletized raw material resin to the heating cylinder 20 is provided.

The raw material resin that has been fed to the heating cylinder 20 from the hopper 25 is sent to the front end side of the screw 21 by the screw 21 that rotates within the heating cylinder 20. At the same time, while being sheared, the raw material resin is molten by shear heat and heat of the heater provided in the heating cylinder 20, and is plasticized. The raw material resin that is plasticized in this way is sent to the front end side of the heating cylinder 20 while being kneaded by the rotation of the screw 21.

Further, in the heating cylinder 20, foaming gas injection valves 24a and 24b for injecting a foaming gas which is to be dissolved in the plasticized molten resin are provided. As the foaming gas, an inert gas such as a carbon dioxide gas or a nitrogen gas can be used.

Also, a check valve 23, that opens in a direction in which the molten resin that has been fed from the hopper 25 and plasticized is sent to the front end side of the heating cylinder 20 and does not open in the opposite direction, is provided at the screw 21. Then, a foaming gas is dissolved in the plasticized molten resin that has been sent to the front end side of the heating cylinder 20 by the rotation of the screw 21 and has passed the check valve 23.

Then, by the check valve 23 provided at the screw 21, flowing out of the foaming gas that has been injected to the heating cylinder 20 to the rear end side of the heating cylinder 20 is prevented, and as a result, lowering in resin pressure of the molten resin to be sent to the front end side of the heating cylinder 20 is avoided, whereby foaming of a foaming gas which is dissolved in the molten resin caused by reduction in pressure in the heating cylinder 20 is suppressed.

Further, the advance and retreat movements of the screw 21 are controlled such that according as the molten resin that has been plasticized and in which a foaming gas has been dissolved accumulates in the front end side of the heating cylinder 20, the screw 21 retreats in such a manner that it is pushed back by the resin pressure, and then the screw 21 advances when a prescribed amount of the plasticized molten resin is accumulated in the front end side of the heating cylinder 20. At this time, by keeping the resin pressure of the molten resin at a constant level or at a level that is equal to or higher than the constant level by controlling the retreating of the screw 21 by a back pressure control part of the plasticizing unit 2, foaming of the impregnating inert gas can be suppressed.

As mentioned above, the plasticizing unit 2 transfers the plasticized molten resin in which a foaming gas to the injection unit 3 by advancing the screw 21 that has retreated to a prescribed position due to accumulation in the front end side of the heating cylinder 20 of the molten resin in which a foaming gas is dissolved. At this time, the stroke length for which the screw 21 advances and retreats can be appropriately set in accordance with the amount of the molten resin to be sent to the injection unit 3, i.e. the dimension of an injection molding such as a preform and the number of cavities in a mold.

The position of a foaming gas injection valve 24 provided on the heating cylinder 20 can be set in accordance with the stroke length for which the screw 21 advances and retreats such that, even when the screw 21 reaches the position where the screw 21 most retreats (hereinafter referred to as the "retreat limit"), the foaming gas injection valve 24 is positioned rearer than the front end of the screw 21. The number of the foaming gas injection valve 24 provided on the heating cylinder 20 may be one. In the example shown in FIG. 1, plural (two) foaming gas injection valves 24a and 24b are provided along the direction of the advance and retreat of the screw 21. When plural foaming gas injection valves 24 are provided, in accordance with the position of the screw 21 that advances and retreats within the heating cylinder 20, the foaming gas injection valve 24 is switched such that a foaming gas is injected from the foaming gas injection valve 24 that is positioned rearer than the front end of the screw 21.

For example, in the examples shown in FIG. 4(a) and FIG. 4(b), in the process during which the screw 21 retreats, among the two foaming gas injection valves 24a and 24b, the foaming gas injection valve 24a provided nearer to the front end side of the heating cylinder 20 is positioned on the front end side relative to the front end of the screw 21. In such a case, injection of a foaming gas from the foaming gas injection valve 24a may be stopped, and the foaming gas injection valve 24 may be switched such that a foaming gas is injected from the foaming gas injection valve 24b that is positioned on the rear end side relative to the front end of the screw 21.

The position of the check valve 23 provided on the screw 21 can be set such that, even when the screw 21 reaches the position where the screw 21 most advances (hereinafter referred to as the "advance limit"), the check valve 23 can be positioned on the rear end side of the heating cylinder 20 on which the foaming gas injection valve 24 is provided. When plural check valves 23 are provided, the valves may be positioned on the front end side of the heating cylinder 20 on which the foaming gas injection valve 24 is provided. In such a case, the foaming gas injection valve 24 may be switched such that injection of an inert gas from the foaming gas injection valve 24 stops.

In this embodiment, the check valve 23 is provided on the screw 21. This check valve 23 is provided primarily with an aim of preventing the molten resin in which a foaming gas that has been injected to the heating cylinder 20 is dissolved from flowing out to the rear end side of the heating cylinder 20. In this embodiment, a transfer process is conducted by allowing the screw 21 to advance while rotating. During the period of time for which the transfer process is conducted by the screw 21, an internal pressure (thrust Pm) of the molten resin to be sent to the front end side of the heating cylinder 20 is generated by the rotation of the screw. Therefore, by designing and setting the conditions of the screw 21 such that the thrust Pm becomes larger than the transfer pressure (Pt), there will be no need to provide, on the front end of the screw 21, a check valve or the like that prevents back-rush of the raw material resin.

As mentioned above, on the front end of the screw 21 of the present invention, no check valve is provided. Therefore, the helical wing part 22 that plasticizes the raw material resin can be formed long enough to reach the front end of the screw 21. Accordingly, plasticizing of the raw material resin and kneading of an inert foaming gas and a molten resin can be improved.

Inside the heat-retaining cylinder 30 provided in the injection unit 3, a plunger rod 31 as an injection member is arranged. By a plunger driving part (not shown), the advance and retreat movements of the plunger 32 in the heat-retaining cylinder 30 are controlled.

In the plasticizing unit 2, the raw material resin is plasticized, and the plasticized molten resin in which a foaming gas is dissolved. Such a molten resin is then transferred to the injection unit 3, and is accumulated in the heat-retaining cylinder 30 of the injection unit 3. According as the molten resin accumulates in the heat-retaining cylinder 30, the plunger rod 31 is pushed back and retreats by the resin pressure of the molten resin accumulated in the heat-retaining cylinder 30. At this time, by appropriately adjusting the stroke length for which the plunger 32 advances and retreats, the molten resin to be injected is weighed. In order to prevent foaming of a foaming gas which is dissolved in the molten resin, the plunger 32 retreats while keeping the resin pressure of the molten resin accumulated in the heat-retaining cylinder 30 to be a constant level or be at a level that is equal to or higher than the constant level. On the other hand, as for the plunger 32, the advance and retreat movements thereof are controlled such that it advances when a prescribed amount of the molten resin is accumulated in the heat-retaining cylinder 30.

As mentioned above, in the injection unit 3, the plunger 32 retreats and advances, whereby the molten resin accumulated in the heat-retaining cylinder 30 is weighed, and then a prescribed amount of the molten resin is injected from a nozzle part 5.

In this embodiment, by passing through a plasticizing process, a transfer process and an injection process explained below using the above-mentioned injection apparatus 1, a foamable injection molded product is produced.

[Plasticizing Process]

First, in the plasticizing unit 2, a pelletized raw material resin that has been fed from the hopper 25 to the heating cylinder 20 is plasticized.

In this embodiment, by injecting a foaming gas from the foaming gas injection valve 24, a foaming gas is dissolved in the plasticized molten resin. The timing of injecting a foaming gas will be stated later.

Figure 4:
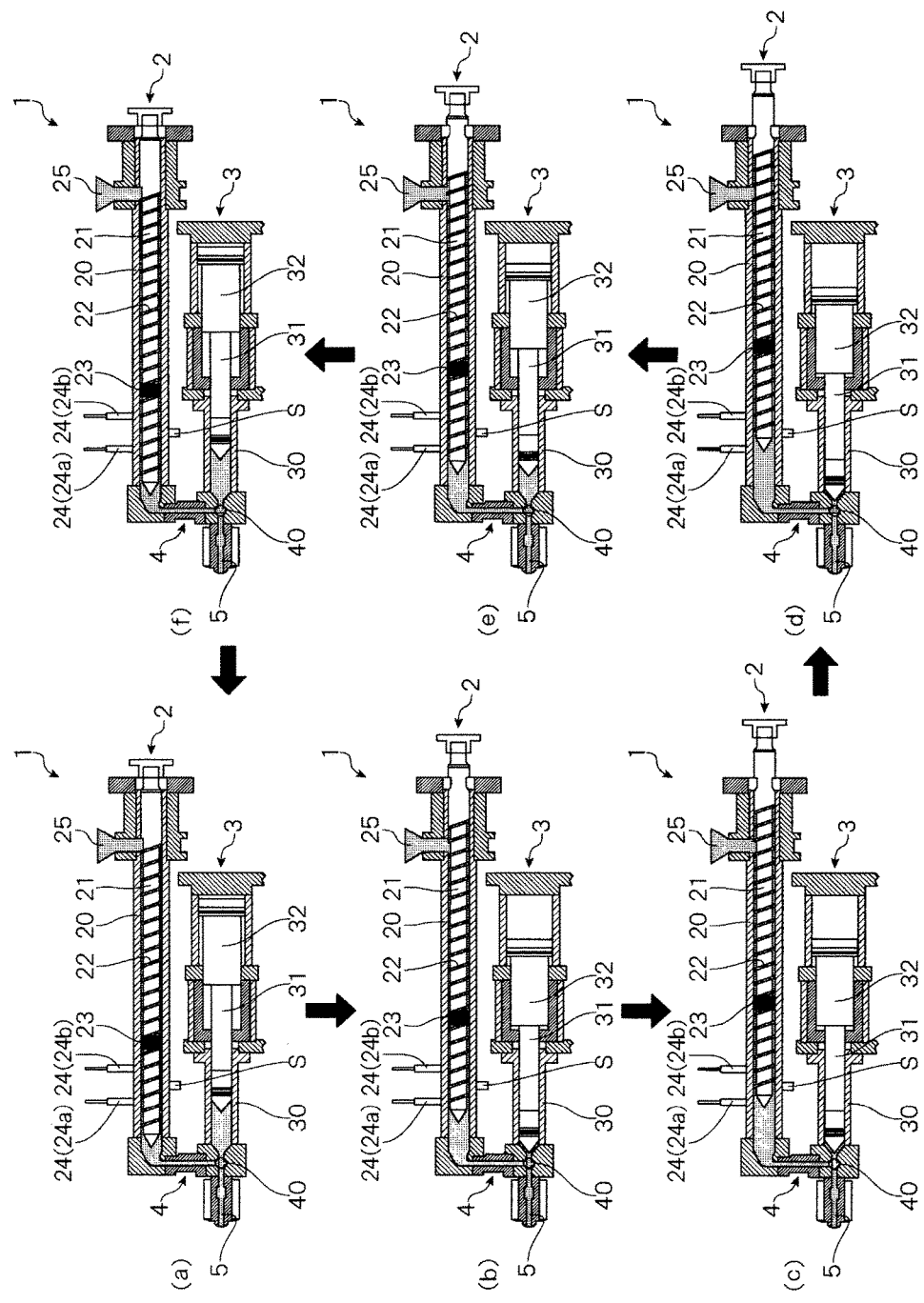
FIG. 4 is a process drawing showing an outline of a method for producing foamable injection molded product according to an embodiment of the invention.

In this plasticizing process, the rotary valve 40 is switched as shown in FIG. 3, and a raw material resin that has been fed from the hopper 25 is plasticized as mentioned above. As shown in FIG. 4(*a*) to FIG. 4(*c*) in sequence, the screw 21 that rotates in the heating cylinder 20 plasticizes the raw material resin. The screw 21 is pushed back and retreats by the resin pressure of the molten resin accumulated in the front end side of the heating cylinder 20 while sending the raw material resin in which a foaming gas is dissolved to the front end side of the heating cylinder 20.

FIG. 4(*a*) shows the state where the rotating screw 21 starts to advance in the initial stage of the plasticizing process. As shown in FIG. 4(*b*) and FIG. 4(*c*) in sequence, as the molten resin is accumulated in the front end side of the heating cylinder 20, the screw 21 retreats until it reaches a predetermined stroke or until a predetermined period of time lapses.

[Transfer Process]

In the transfer process that is conducted subsequent to the plasticizing process, the molten resin that is plasticized and in which a foaming gas is dissolved in the plasticizing unit 2 is transferred to the injection unit 3. Prior to this transfer, the rotary valve 40 is switched as shown in FIG. 2. When a predetermined amount of a molten resin is accumulated in the front end side of the screw 21 that has retreated in the plasticizing process, as shown in FIG. 4(*d*) to FIG. 4(*e*) in sequence, the screw 21 advances while rotating. After that, if necessary, the screw 21 may continue to rotate at the advance limit. As a result, a prescribed amount of the molten resin that is plasticized and in which a foaming gas is dissolved is transferred to the injection unit 3.

FIG. 4(*d*) shows a state in which the screw 21 starts to advance while rotating in the initial stage of the transfer process. As shown in FIG. 4(*e*) and FIG. 4(*f*) in sequence, a molten resin accumulated in the front end side of the heating cylinder 20 is transferred to the injection unit 3.

At this time, the screw 21 (see FIG. 4(*c*)) that has retreated until it reaches a prescribed stroke or until a prescribed period of time is lapsed in the plasticization process, after the completion of the plasticization process and before the shifting to transfer process, depending on the cycle, stops rotation, and keeps the resin pressure of the molten resin accumulated in the front end side of the heating cylinder 20 at a constant level or at a level that is equal to or higher than the constant level, and advances together with the re-start of the rotation of the screw 21 after the lapse of a prescribed period of time. In the later stage of the plasticization process, the resin pressure of the resin accumulated in the front end side of the heating cylinder 20 may be kept at a constant level or at a level that is equal to or higher than the constant level, and when the screw 21 retreats until it reaches a prescribed stroke or until a prescribed period of time lapses, the transfer process may start, thereby to allow the screw 21 to advance without stopping the rotation of the screw 21.

Then, after the screw 21 has retreated to a prescribed position with the rotation thereof being controlled, the screw 21 advances to start the transfer process. By doing so, the resin pressure of the molten resin accumulated in the front end side of the heating cylinder 20 can be kept at a constant level during a period of time from the completion of the plasticization process to the shifting of the transfer process.

The molten resin that has been transferred to the injection unit 3 is accumulated in the heat-retaining cylinder 30 while pushing the plunger rod 31 back to allow it to retreat by the resin pressure (see FIG. 4(*e*) and FIG. 4(*f*)), and is weighed in a prescribed amount in accordance with the stroke length of the plunger rod 31. When the plunger 32 retreats to a prescribed position and the transfer process is completed (see FIG. 4(*f*)), the rotary valve 40 is switched as shown in FIG. 3, whereafter the above-mentioned the plasticization processes shown in FIG. 4(*a*) to FIG. 4(*c*) in sequence re-start.

As for the timing when the plasticization process re-starts by switching the rotary valve 40, it may be conducted simultaneously with the time when screw 21 reaches the advance limit or after the screw 21 rotates for a certain period of time at the advance limit or before the screw 21 reaches the advance limit. When shifting from the transfer process to the plasticizing process, in order to prevent lowering in pressure of the molten resin between the front end of the screw 21 and the connection part, the screw 21 keeps on rotating.

As mentioned above, by allowing the screw 21 to keep on rotating, the plasticizing performance is improved, and the resin pressure of the molten resin in the screw 21 is stabilized.

[Injection Process]

When the rotary valve 40 is switched as shown in FIG. 3 after the completion of the transfer process, the injection process is conducted in parallel with the plasticization process that has re-started.

In the injection process, as shown in FIG. 4(*a*) to FIG. 4(*c*) in sequence, due to the advancement of the plunger rod 31 of the injection unit 3, a prescribed amount of the molten resin that has been weighed is injected from the nozzle part 5, and by a mold not shown, a foamable injection molded product having a prescribed shape is molded.

Here, FIG. 4(*a*) shows the state where the plunger 32 starts to advance in the initial stage of the injection process. As shown in FIG. 4(*b*) and FIG. 4(*c*) in sequence, a prescribed amount of the molten resin that has been weighed in the heat-retaining cylinder 30 is injected from the nozzle 5.

When the injection process is completed, the plasticizing process is completed (see FIG. 4(*c*)) and the transfer process re-starts (see FIG. 4(*d*)). These processes are repeated.

[Timing of Injecting Inert Gas]

In this embodiment, the processes mentioned above are repeated to produce a foamable injection molded product. The timing when a foaming gas starts to be injected to the molten resin that has been kneaded and plasticized by means of the rotating screw 21 can be controlled as follows.

(1) Injection of a foaming gas starts simultaneously with the start of the transfer process or after the lapse of a predetermined period of time after the start of the transfer process.

(2) Injection of a foaming gas starts after the start of the transfer process and the screw 21 that advances in the heating cylinder 20 reaches a predetermined position.

(3) Injection of a foaming gas starts after the completion of the transfer process and after the lapse of a prescribed period of time after the plasticization process starts.
(4) Injection of a foaming gas starts after the completion of the transfer process and after the screw 21 that advances in the heating cylinder 20 reaches a prescribed position after the start of the plasticization process.

As for the timing of starting injection of a foaming gas, the best timing is appropriately selected from (1) to (4) mentioned above. For example, If the injection period of a foaming gas is prolonged, the best timing of starting injection can be selected from (1) or (2) taking into consideration the relation with other various conditions. Further, if the injection period of a foaming gas is shortened, the time of starting injection can be selected from (3) or (4).

Parameters such as the injection pressure, the injection amount or the like of a foaming gas are appropriately set and controlled in advance taking into consideration the optimization of the injection molding.

In the case where timing of starting injection of a foaming gas is controlled in accordance with (1) to (4) mentioned above, the relationship between the injection period, the position of the screw 21, the rotation speed of the screw 21 and the resin pressure of the molten resin accumulated in the front end side of the heating cylinder 20, timing of starting injection of a foaming gas, is controlled in accordance with (1) to (4) mentioned above is shown in FIG. 5.

Figure 5:
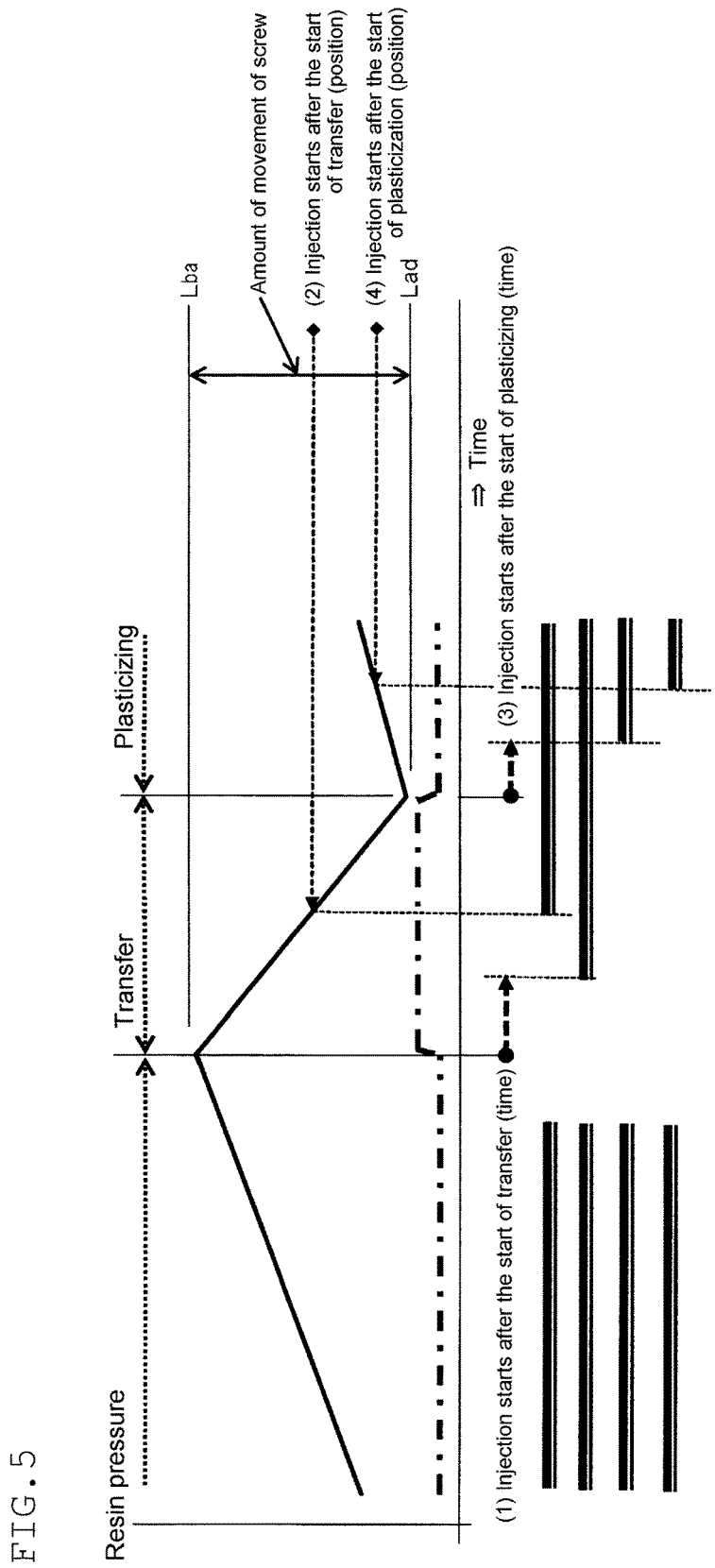
FIG. 5 is a correlation diagram showing one example of the relationship between the injection time of a foaming gas, the position of a screw, the rotational speed of a screw and the resin pressure of a molten resin accumulated on the front end side of a heating cylinder of a plasticizing unit.

One example of the above-mentioned timing of starting injection of a foaming gas to the plasticized molten resin; i.e. (1), (2), (3) and (4); is shown in FIG. 5. In FIG. 5, injection period of a foaming gas is shown as a double line and a portion with no double line indicates a period during which injection is stopped.

The amount of movement of the position of the screw 21 is indicated by a solid line, and the position where the screw 21 most retreats and plasticization is completed (retreat limit) is indicated as Lba and the position where the screw 21 is most advanced (advance limit) is indicated as Lad. Further, a variation in resin pressure of the molten resin accumulated in the front end side of the heating cylinder 20 is indicated by a long dashed short dashed line.

By controlling the time of starting injection of a foaming gas and the injection period of a foaming gas in the above-mentioned way, a foaming gas can be injected to the molten resin in the state being kneaded by the screw 21 that is rotating. When shifting from the transfer process to the plasticizing process, the screw 21 that has advanced to the advance limit or a position that is immediately before the advance limit in the transfer process starts to retreat while rotating. Before the completion of the plasticizing process, injection of a foaming gas stops. In other words, during a period of time from the start of injection in (1) to (4) mentioned above to the completion of the plasticizing process, a necessary amount of a foaming gas is injected.

Accordingly, after injection of a foaming gas stops, kneading of the molten resin in which a foaming gas is dissolved by the screw 21 that is rotating continues, whereby impregnation of a foaming gas in the molten resin is conducted homogenously. As a result, a necessary amount of a gas can be injected to the plasticized molten resin without affecting adversely the plasticizing time of the raw material resin in the molding cycle, whereby improvement of plasticizing performance and impregnation of a foaming gas can be realized, thus leading to improvement in productivity.

By allowing the time of starting injecting a foaming gas to the plasticized molten resin to be (1) or (2) mentioned above, a foaming gas can be injected after the start of the transfer, i.e. immediately after the start of the rotation of the screw. Whereby, for the period of time from the start of the rotation of the screw to the termination of the rotation of the screw, a longer gas injection time can be ensured. As a result, an increase in amount of injected gas can be possible, whereby a gas can be injected uniformly and evenly during the plasticizing process. On the other hand, by allowing the time of starting injection of a foaming gas to be (3) or (4) mentioned above, after the transfer process is completed, a gas is injected when the screw monotonically retreats, so the resin pressure is relatively stabilized, and hence the amount of an injected gas can be controlled easily with a high accuracy.

When a foaming gas is injected from the foaming gas injection valve 24 to the heating cylinder 20, following pressures are appropriately adjusted such that the resin pressure (Pm) of the molten resin before passing the check valve 23 becomes larger than the sum of the injection pressure (P2) of a foaming gas and the transfer pressure (P3) of the molten resin that is sent to the front end side of the heating cylinder 20 after passing the check valve 23 (Pm>P2+P3). As a result, a disadvantage that, when the plasticized molten resin is sent to the front end side of the heating cylinder 20 by means of the rotating screw 21, the check valve 23 is closed and hence the molten resin cannot pass the check valve 23 can be avoided.

Then, in order to avoid the disadvantage mentioned above, it is preferred that, by means of a resin pressure sensor S that is attached on the same circumference as that on which the injection gas injection valve 24 is attached, the total of P2 and P3 (P2+P3) be detected, and when the P2+P3 becomes equal to or larger than the predetermined value of the resin pressure, the injection pressure of a foaming gas P2 be lowered or the operation of the injection apparatus 1 be controlled to stop it.

In the present invention, that was explained above with reference to the embodiments, the following processes (A) to (D) are repeated to produce a foamable injection molded product:
(A) a plasticizing process wherein the raw material resin is plasticized by means of the screw 21 provided inside the heating cylinder 20 of the plasticizing unit 2, the foaming gas injected from the foaming gas injection valve 24 is dissolved in the plasticized molten resin, and the screw 21 retreats according as the molten resin accumulates in the front end side of the heating cylinder 20 by the screw 21 that is rotating;
(B) a transfer process wherein the screw 21 that has retreated to a predetermined position is caused to advance while rotating, and the molten resin which has been accumulated in the front end side of the heating cylinder 20 is transferred to the injection unit 3;
(C) when the transfer process is completed, the plasticizing process re-starts without stopping the rotation of the screw 21 and an injection process in which the molten resin is injected from the injection unit 3 is conducted;
(D) when the injection molding process is completed, the plasticizing process is completed and the transfer process re-starts.

By repeating the processes A to D above, a foamable injection molded product is produced.

By producing a foamable injection-molded product as mentioned above, in the transfer process, in particular, when transferring the plasticized molten resin in which a foaming gas is dissolved and that is accumulated in the front end side of the heating cylinder 20 to the injection unit 3, it becomes possible to allow the screw 21 to advance while rotating, i.e., to continue the melting process of the raw material resin without stopping, whereby the molding cycle is prevented from being deteriorated. The raw material resin can be sufficiently plasticized and kneaded. Further, by appropriately adjusting the rotation speed and the advancing speed of the screw 21, a back pressure is applied to the molten resin in which the foaming gas is dissolved, whereby foaming of the foaming gas can be suppressed. As a result, a foamable injection molded product in which plasticization of the raw material resin and dissolution of a foaming gas are improved can be produced.

Accordingly, when a synthetic resin-made foamed bottle mentioned above in which foams are distributed on the bottle wall is mass-produced, by dissolving an inert gas such as a carbon dioxide gas or a nitrogen gas as a foaming gas in a thermoplastic resin such as polyethylene terephthalate by applying the present invention, thereby to produce a preform by injection molding, plasticizing of raw material resins in the molding cycle and impregnation of a preform with a foaming gas can be improved. By subjecting the preform to biaxial stretch blow molding, a synthetic resin-made foamed bottle in which fine cells are uniformly distributed can be mass-produced in a high yield.

Hereinabove, the present invention was explained with reference to preferred embodiments. However, the present invention is not restricted to the above-mentioned embodiments. For example, as mentioned above, the present invention can be applied to a technology of producing a foamable injection molded product in which a foaming gas such as an inert gas is dissolved in a thermoplastic resin and fine foams are formed at the time of injecting molding an injection molding such as a preform. It is needless to say that various modifications are possible within the scope of the present invention.

As an example of application of the present invention, a technology in which a foamable injection molded product is molded by biaxial stretch blow molding in order to mass-produce a synthetic resin-made foamed bottle in which foams are distributed on the bottle wall was given. The present invention is not limited to such a technical field, and can be applied to various technical fields as a technology of producing a foamable injection molded product in which a foaming gas such as an inert gas is dissolved.

INDUSTRIAL APPLICABILITY

As mentioned above, the present invention can be applied to various technical fields as a technology of producing a foamable injection molded product in which a foaming gas such as an inert gas is dissolved.

EXPLANATION OF REFERENTIAL NUMERALS

1. Injection apparatus
2. Plasticizing unit
20. Heating cylinder
21. Screw
23. Check valve
24. Foaming gas injection valve
3. Injection unit

The invention claimed is:

1. A method for producing foamable injection molded product using an injection apparatus comprising a plasticizing unit that plasticizes a raw material resin and an injection unit that injects a plasticized molten resin, and the plasticizing unit is provided with a heating cylinder having a foaming gas injection valve and a screw arranged inside the heating cylinder, the method comprises:
  a plasticizing process wherein the raw material resin is plasticized by means of the screw provided inside the heating cylinder of the plasticizing unit, the foaming gas injected from the foaming gas injection valve is dissolved in the plasticized molten resin, and the screw retreats according as the molten resin accumulates in the front end side of the heating cylinder by the screw that is rotating, and
  a transfer process wherein the screw that has retreated to a predetermined position is caused to advance while rotating, and the molten resin which has been accumulated in the front end side of the heating cylinder is transferred to the injection unit;
  wherein, when the transfer process is completed, the plasticizing process re-starts without stopping the rotation of the screw and an injection process in which the molten resin is injected from the injection unit is conducted, and
  when the injection process is completed, the plasticizing process is completed and the transfer process re-starts.

2. The method for producing a foamable injection molded product according to claim 1, wherein, after allowing the screw to advance while rotating, the screw is further rotated, whereby the molten resin is transferred to the injection unit.

3. The method for producing a foamable injection molded product according to claim 1, wherein the foaming gas is injected to the molten resin which has been plasticized by means of the screw that is rotating.

4. The method for producing a foamable injection molded product according to claim 1, wherein, simultaneously with the start of the transfer process or after the lapse of a predetermined period of time from the start of the transfer process, the injection of a foaming gas starts.

5. The method for producing a foamable injection molded product according to claim 1, wherein, after the start of the transfer process and after the screw that advances in the heating cylinder reaches a predetermined position, the injection of a foaming gas starts.

6. The method for producing a foamable injection molded product according to claim 1, wherein, after the completion of the transfer process and after the lapse of a predetermined period of time from the start of the plasticizing process, the injection of a foaming gas starts.

7. The method for producing a foamable injection molded product according to claim 1, wherein, after the completion of the transfer process and after the screw that advances inside the heating cylinder from the start of the plasticization process reaches a predetermined position, the injection of a foaming gas starts.

8. The method for producing a foamable injection molded product according to claim 1, wherein the injection of a foaming gas stops before the completion of the plasticization process.

9. The method for producing a foamable injection molded product according to claim 1, wherein the screw is provided with a check valve, and the molten resin which has been sent to the front end side of the heating cylinder by the rotation of the screw and has passed through the check valve is dissolved in the foaming gas.

* * * * *